June 4, 1968
J. F. BUFFINGTON
3,387,202
ROTARY PHASE CONVERTER SYSTEM
Filed Aug. 25, 1966
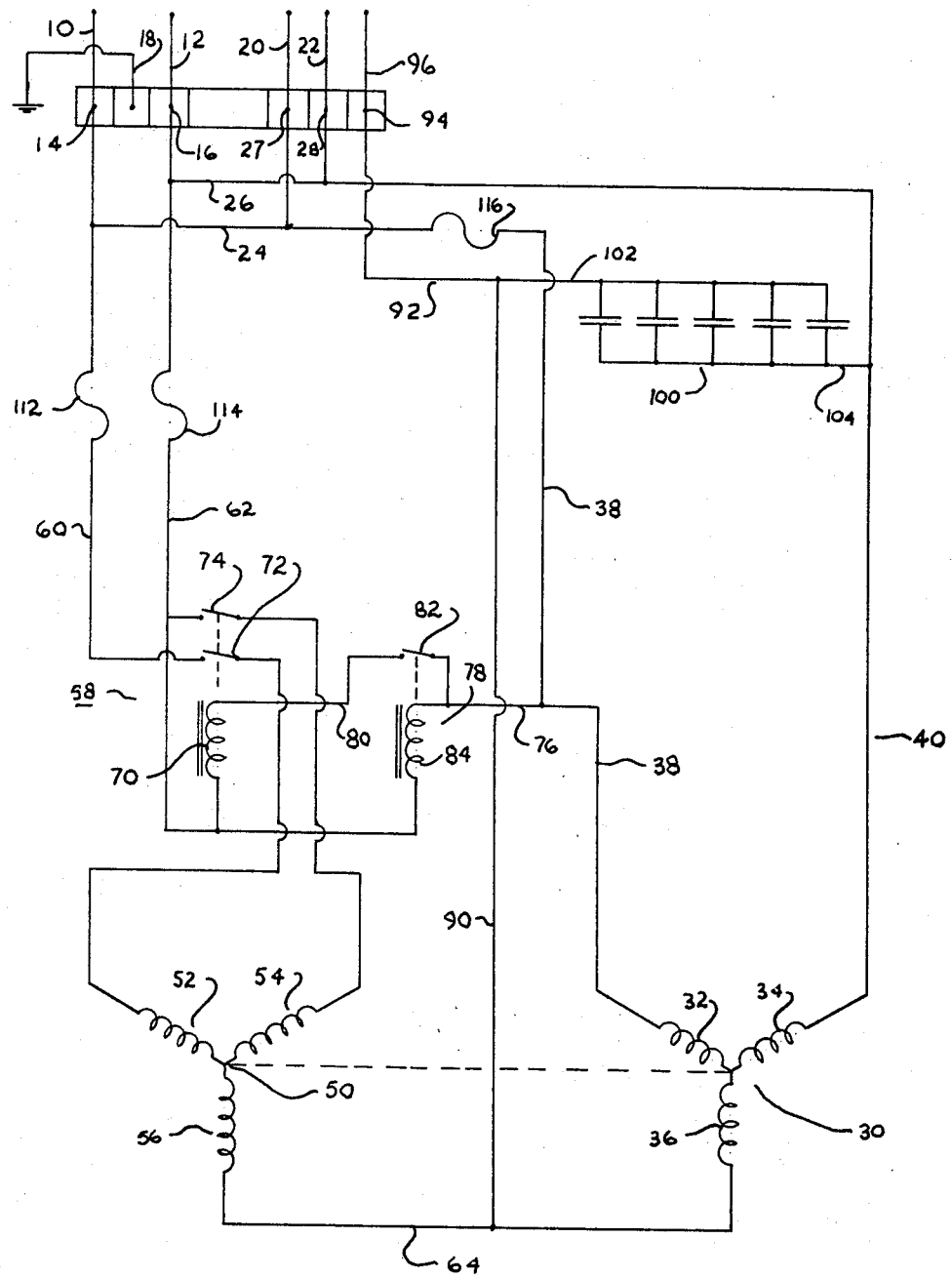
INVENTOR.
JAMES F. BUFFINGTON
BY
*M. A. Hobbs*
ATTORNEY United States Patent Office
3,387,202
Patented June 4, 1968

3,387,202
ROTARY PHASE CONVERTER SYSTEM
James F. Buffington, R.R. 3, Plymouth, Ind. 46563
Filed Aug. 25, 1966, Ser. No. 575,084
6 Claims. (Cl. 321—55)

The present invention relates to phase converters, and more particularly to a rotary phase converter system for converting a single-phase input into a three-phase output.

In many industrial and farm installations it is necessary to operate three-phase equipment when only a single-phase line is present, and the added expense of procuring a three-phase line cannot be justified in view of the relatively limited operation. In addition, there are many antiquated power systems in existence today which only provide a single-phase power line for their customers, such as in residential areas and other areas where relatively light loads are drawn, which are generally only wired for single-phase operation. Therefore, when the use of three-phase machinery is contemplated in areas in which only single-phase power is available, some means of converting the single-phase power to three-phase power is needed. In the past, this requirement has been satisfied by a simple capacitor phase-shift system in which a large high-voltage capacitor is wired between one side of the single-phase line and a winding on a three-phase motor, for example, with the other two windings connected directly to the line. The capacitor accomplishes the necessary phase shift. While this method is effective and relatively simple and inexpensive, it lacks stability under varying loads, the starting torque of the motor of such a system is very low, and such a system is usually uneconomical because there is no provision to adjust the power factor to its optimum value. It is therefore a principal and an important object of this invention to provide a reliable, relatively simple and economical means for procuring three-phase power from a single-phase line, which will operate in the initial starting operation on a low inrush of current, and which is capable of handling a relatively large load after the starting operation.

It is a further object of the invention to provide a means of the aforesaid type which produces high starting torque and stability under widely varying load conditions.

Yet another object of this invention is to provide a means of the aforesaid type, constructed of standard and readily available components, in which the power factor of the system can be readily adjusted to obtain optimum performance.

Additional objects and advantages will become apparent from the following description and accompanying drawing, wherein is shown a schematic diagram of the circuit of the present invention.

In the diagram, numerals 10 and 12 indicate single-phase alternating current input lines, the lines being connected directly to two terminals 14 and 16, respectively, and having associated therewith a ground terminal 18. Two lines 10 and 12 are connected to output lines 20 and 22 through leads 24 and 26 and terminals 27 and 28 respectively. The two output lines are connected to a three-phase motor (not shown) of any suitable conventional construction and operation.

In order to provide the three-phase current for the motor, a system shown in the drawings is used, consisting of a starting motor and small transformer 30 having windings 32, 34 and 36, with windings 32 and 34 connected to input leads 10 and 12 through terminals 14 and 16, leads 24 and 26, and leads 38 and 40, respectively. A large rotating transformer 50 is driven by a direct drive from starting motor-transformer 30. Both of the two motors are rotating transformers and are connected in the well known Y configuration, the purpose of starting motor 30 being to bring rotating transformer 50 up to synchronous speed, at which speed the rotating transformer 50 supplies the three-phase output. In the embodiment shown, the synchronous speed between the two motors is 1800 r.p.m., and until the synchronous speed is reached the large rotating transformer 50 is, in effect, inoperable. The rotating transformer 50 contains windings 52, 54 and 56, the first two being connected through a relay system 58, and leads 60 and 62 by the two input lines 10 and 12, and winding 56 is connected to winding 36 by lead 64.

Relay system 58 includes a coil 70 and operating switches 72 and 74 for controlling the current from input leads 10 and 12 through leads 60 and 62, to windings 52 and 54, respectively. In order to prevent rotating transformer 50 from becoming operable before the synchronous speed has been reached, the relay system 58 is used, consisting of the two switches 72 and 74 operated by coil 70, the coil 70 being connected to input line 10 by leads 24, 38 and 76, time delay relay 78, a thermal type relay for example, and lead 80, having therein a switch 82. The coil 84 of relay 78 and coil 70 of relay 58 are connected to lead 12 by lead 62, thus completing the circuit through the two coils.

When the circuit is energized by the alternating current from input leads 10 and 12, windings 32 and 34 of starting motor-transformer 30 receive energizing current directly from the two leads, and winding 36 receives a phase shifted voltage from capacitor bank 100, the capacitor being connected into the system by lead 102 connecting the capacitor to lead 92, and lead 104 connecting the capacitor to lead 40. The phase shift of the capacitor is sufficient to allow rotational torque to be produced by motor-transformer 30, which while utilizing only a small inrush of current, drives rotating transformer 50 up to synchronous speed. The time delay relay 78 controls the operation of transformer 50 so that it is not connected with the output leads until after sufficient time has elapsed for synchronous speed to be obtained. The time-delay relay 78 is energized in response to the energization of starting motor 30, and, after sufficient time has elapsed for the speed of the starting motor-transformer 30 to reach 1800 r.p.m., coil 84 is energized, thus closing switch 82 which completes the circuit to coil 70, which in turn closes switches 72 and 74, thus completing the circuit from input leads 10 and 12 to windings 52 and 54. At synchronous speed, voltage flowing in windings 52 and 54 of transformer 50 induces a current of a third phase in winding 56 for the three-phase output. This third phase current is transmitted through leads 90 and 92 to terminal 94 and output lead 96. The frequency of the output is automatically synchronized with that of the input, and once the phase shift of the circuit is initially adjusted, the phase of the output current changes insignificantly.

In the inductive circuit of Y-connected transformer 50, current lags behind voltage in phase relationship, while in the capacitive circuit of capacitor bank 100, current leads voltage. Since winding 56 of transformer 50 is connected to the capacitor bank, total phase displacement of the third phase output of lead 96 is determined by the combination of the inductance of winding 56 and the capacitance of capacitor bank 100. Since current lags voltage in the inductive circuit and leads voltage in the capacitive circuit, by determining the number and size of the capacitors comprising the capacitor bank, the phase present in output line 96 can have either a leading or lagging value, and since this phase angle determines the power factor, the power factor can be adjusted as the load requires.

Increases in load usually cause temporary decreases in current available for the load, and decreases in load usually cause surges of current which can often cause damage to load machinery. However, in the present invention, because the converter is a rotary converter system, these instabilities are minimized by the kinetic energy possessed by rotating transformer 50. An increased load causes momentary decrease in the speed of rotation of the transformer, while the load circuit continues to receive substantially the same amount of current. Greater load handling capabilities of the system are made possible because starter motor 30 acts as a rotating transformer, since its windings 32, 34 and 36 are connected in parallel with windings 52, 54 and 56, respectively, of transformer 50. After relays 78 and 58 are energized, third phase energy produced by winding 56 of transformer 50 is augmented by the third phase energy produced by winding 36 of starter motor 30. Thus greater load handling capabilities are realized and regulation of the system under load is consequently better.

Fuses 112, 114 and 116 are preferably included in leads 60, 62, and 38 in order to prevent operation of the entire system in case of excessive overloads. Fuses 112 and 114 protect only the output circuit and simply disconnect transformer 50 from the load if severe overload occurs. While only one embodiment of the present invention has been described in detail herein, various changes and modifications may be made without departing from the scope of the invention.

I claim:

1. A rotary phase converter system for converting a single-phase input to a three-phase output, comprising a starting motor-transformer having three windings and a phase converter transformer having three windings and being connected to and driven by said starting motor-transformer, a single-phase input having two terminals, a three-phase output havings three terminals, leads connecting said input terminals with two of said output terminals, leads connecting said input terminals with two of the windings of said starting motor-transformer, leads connecting said input terminals with two of the windings of said phase converter transformer, a relay means controlling the current through said last two leads, a relay responsive to the operation of said starting motor-transformer for controlling said relay means, a lead means connecting the third winding of each of said transformers together and to the third terminal of said three-phase output, and a capacitor connected to said lead means and to one of said first two mentioned leads.

2. A rotary phase converter system as defined in claim 1, in which said relay means includes a switch in said first two lines, a coil for operating both of said switches, leads connected to each of said first two lines, and a switch in one of said last mentioned leads.

3. A rotary phase converter system as defined in claim 2, in which said relay consists of a coil for operating said last mentioned switch.

4. A rotary phase converter system as defined in claim 3, in which said last mentioned coil responds after a predetermined time delay to close the switch controlled thereby, and thereby operate the coil of said relay means to close the switches in the lead between said starting motor-transformer and the respective input terminals.

5. A rotary phase converter system as defined in claim 1, in which said phase converter transformer is connected by a direct mechanical drive to said starting motor-transformer.

6. A rotary phase converter system as defined in claim 4, in which said phase converter transformer is connected by a direct mechanical drive to said starting motor-transformer.

References Cited
UNITED STATES PATENTS

| | | | |
|---|---|---|---|
| 2,557,901 | 6/1951 | Wiseman | 321—7 |
| 2,585,392 | 2/1952 | Letrilliart et al. | 321—55 X |
| 3,271,646 | 9/1966 | Lewus | 312—55 X |

JOHN F. COUCH, *Primary Examiner.*

WARREN E. RAY, *Examiner.*

G. GOLDBERG, *Assistant Examiner.*